(12) United States Patent
Bell, IV et al.

(10) Patent No.: US 11,099,837 B2
(45) Date of Patent: Aug. 24, 2021

(54) PROVIDING BUILD AVOIDANCE WITHOUT REQUIRING LOCAL SOURCE CODE

(71) Applicant: EMC IP Holding Company LLC, Hopkinton, MA (US)

(72) Inventors: Robert J. Bell, IV, Mont Vernon, NH (US); DaoLong Fan, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/667,014

(22) Filed: Oct. 29, 2019

(65) Prior Publication Data
US 2021/0124575 A1   Apr. 29, 2021

(51) Int. Cl.
*G06F 8/71* (2018.01)
*G06F 8/41* (2018.01)
*G06F 16/13* (2019.01)
*G06F 16/14* (2019.01)

(52) U.S. Cl.
CPC ........... *G06F 8/71* (2013.01); *G06F 8/41* (2013.01); *G06F 16/137* (2019.01); *G06F 16/152* (2019.01)

(58) Field of Classification Search
None
See application file for complete search history.

(56) References Cited

U.S. PATENT DOCUMENTS

| | | | |
|---|---|---|---|
| 8,555,297 B1 | 10/2013 | Gould et al. | |
| 8,572,093 B2 | 10/2013 | Weigert et al. | |
| 8,635,447 B1 | 1/2014 | Joyce et al. | |
| 8,850,460 B1 | 9/2014 | Gould et al. | |
| 10,872,034 B2 | 12/2020 | Lv et al. | |
| 2002/0198873 A1* | 12/2002 | Chu-Carroll | G06F 8/36 |
| 2013/0066901 A1* | 3/2013 | Marcelais | G06F 16/137 |
| | | | 707/769 |
| 2013/0311496 A1* | 11/2013 | Fedorenko | G06F 8/71 |
| | | | 707/758 |
| 2017/0017798 A1* | 1/2017 | Bhat | G06F 21/6209 |
| 2017/0147338 A1* | 5/2017 | Jackson | G06F 11/36 |
| 2017/0185675 A1* | 6/2017 | Arngren | G06F 21/10 |
| 2020/0160330 A1* | 5/2020 | Yan | G06Q 20/405 |
| 2020/0264866 A1* | 8/2020 | Collins | G06F 12/0891 |

* cited by examiner

Primary Examiner — Qing Chen
(74) Attorney, Agent, or Firm — BainwoodHuang (57) ABSTRACT

A technique controls a new software build. The technique involves receiving abstract hash values for source code components. Each abstract hash value is derived from a most recent source code version of a respective source code component. The technique further involves generating new build fingerprints based on the abstract hash values. The new build fingerprints are different from the abstract hash values received for the source code components. The technique further involves building particular software components of the new software build based on comparisons between the new build fingerprints and respective previous build fingerprints generated during a set of previous software builds.

20 Claims, 6 Drawing Sheets

PROVIDING BUILD AVOIDANCE WITHOUT REQUIRING LOCAL SOURCE CODE

BACKGROUND

When a conventional build automation tool performs a software build, the conventional build automation tool may take local source code for the software components involved in the build and apply a hash algorithm to the local source code to compute current source code fingerprints for the software components. The conventional build automation tool may then compare the current source code fingerprints to earlier source code fingerprints created when applying the hash algorithm to the local source code for the last build in order to determine which local source code has changed and is required for the current build.

This conventional source code fingerprinting approach provides a better way of determining whether any source code has changed than simply comparing source code timestamps (e.g., file modification dates, check-in/commit times, etc.). Along these lines, some conventional build automation tools may update source code timestamps when the source code is simply touched (e.g., checked out, read, etc.) even though the source code is not changed thus making it difficult to rely on source code timestamps as indicators of source code changes.

SUMMARY

In contrast to the above-described conventional source code fingerprinting and timestamping approaches, improved techniques are directed to providing build avoidance without requiring local source code. In particular, the improved techniques involve creating abstract hash values from source code and then generating build fingerprints from the abstract hash values. An abstract hash value for particular source code changes only when there is an actual change to that source code (i.e., if the particular source code is simply touched or has a changed timestamp, the abstract hash value for that source code stays the same). Since build fingerprints are generated from abstract hash values rather than source code, there is no need to make the source code locally available to a build automation tool. Instead, for a new software build, the abstract hash values are input to a build engine server (or system) which generates new build fingerprints. The build engine server then compares the new build fingerprints to previous build fingerprints and, if there are build fingerprint matches, the build engine server is able to avoid building the corresponding software components (or modules).

It should be understood that the improved techniques are well suited for software development environments where the build engine server and the source code repositories reside at different locations, i.e., a distributed software development environment. Along these lines, for certain software development projects, it may be preferable for the developers to use different source code management (SCM) systems at different locations (e.g., separate remote source code management installations).

For such an environment, for a new build using the improved techniques, the build engine server may simply query the source code repositories at the different locations for abstract hash values to fingerprint in order to determine which software components are not needed for the new build. In contrast, the conventional source code fingerprinting approach would require transferring source code from the different locations to the conventional build automation tool at the build location for local source code fingerprinting thus consuming excess network bandwidth, storage space, processing cycles, etc. at the build location.

Additionally, with the improved techniques, there is no need to use unreliable source code timestamps to determine which source code is not needed for the new build. Along these lines, trying to use the conventional source code timestamping approach in a distributed environment would impose the extra complexity of synchronizing the system time at the build automation tool with the system times at the different repository locations (e.g., synchronizing system clocks). Otherwise, the conventional build automation tool would not be able to rely on accurate timestamps when attempting to determine which source code has changed.

In contrast to conventional approaches, one embodiment is directed to a method of controlling a new software build without requiring local source code. The method includes receiving abstract hash values for source code components. Each abstract hash value is derived from a most recent source code version of a respective source code component. The method further includes generating new build fingerprints based on the abstract hash values. The new build fingerprints are different from the abstract hash values received for the source code components. The method further includes building particular software components of the new software build based on comparisons between the new build fingerprints and respective previous build fingerprints generated during a set of previous software builds.

In some arrangements, the source code components include a first source code component residing at a first location and a second source code component residing at a second location that is different from the first location. Additionally, receiving the abstract hash values for the source code components includes obtaining, over a computer network, a first abstract hash value from the first source code component residing at the first location and a second abstract hash value from the second source code component residing at the second location.

In some arrangements, the first source code component residing at the first location includes a first source code management (SCM) system that stores first source code. Additionally, the second source code component residing at the second location includes a second SCM system that stores second source code that is different from the first source code. Furthermore, obtaining the first abstract hash value and the second abstract hash value includes querying the first SCM system to derive the first abstract hash value based on a most recent version of the first source code, and separately querying the second SCM system to derive the second abstract hash value based on a most recent version of the second source code.

In some arrangements, querying the first SCM system to derive the first abstract hash value includes sending a first query message to the first SCM system over the computer network. Additionally, querying the second SCM system to derive the second abstract hash value includes sending a second query message to the second SCM system over the computer network prior to receiving the first abstract hash value from first SCM system in response to the first query message.

In some arrangements, a build engine system stores the respective previous build fingerprints generated during the set of previous software builds. The build engine system resides at a build engine location that is different from the first location and that is different from the second location. Additionally, generating the new build fingerprints based on the abstract hash values includes hashing, by the build engine system, the abstract hash values to generate the new build fingerprints.

In some arrangements, the new build fingerprints includes a first new build fingerprint corresponding to the first source code component and a second new build fingerprint corresponding to the second source code component. Additionally, the build engine system generated the previous build fingerprints using a particular hash algorithm. Furthermore, hashing the abstract hash values includes applying the particular hash algorithm to the first abstract hash value from the first source code component to generate the first new build fingerprint corresponding to the first source code component, and applying the particular hash algorithm to the second abstract hash value from the second source code component to generate the second new build fingerprint corresponding to the second source code component.

In some arrangements, the new build fingerprints include a first new build fingerprint corresponding to the first source code component and a second new build fingerprint corresponding to the second source code component. Additionally, building the particular software components of the new software build includes comparing the first new build fingerprint with a first previous build fingerprint corresponding to the first source code component to provide a first comparison result, and comparing the second new build fingerprint with a second previous build fingerprint corresponding to the second source code component to provide a second comparison result.

In some arrangements, building the particular software components of the new software build further includes building a first software component in response to the first comparison result indicating that the first new build fingerprint does not match the first previous build fingerprint, and refraining from building a second software component in response to the second comparison result indicating that the second new build fingerprint matches the second previous build fingerprint.

In some arrangements, building the first software component in response to the first comparison result indicating that the first new build fingerprint does not match the first previous build fingerprint includes copying first source code from the first source code component residing at the first location to a build engine system at a build engine location over the computer network, the build engine location being different from the first location, and creating the first software component from a version of the first source code copied to the build engine system. Additionally, refraining from building the second software component in response to the second comparison result indicating that the second new build fingerprint matches the second previous build fingerprint includes refraining from copying second source code from the second source code component residing at the second location to the build engine system at the build engine location over the computer network, and retrieving a prebuilt artifact as the second software component.

In some arrangements, each fingerprint is an algorithmically computed identifier that is generated by a build engine system. Additionally, each abstract hash value is an algorithmically computed identifier that is generated by a SCM system that is different from the build engine system.

In some arrangements, the method further includes managing, by the build engine system, a respective list of dependencies and a respective set of build attributes for each source code component. Additionally, the build engine system is constructed and arranged to generate, for each source code component, a new build fingerprint based on a most recent abstract hash value for that source code component, a most recent list of dependencies for that source code component, and a most recent set of build attributes for that source code component.

In some arrangements, a third source code component residing at the third location includes a third SCM system that stores a particular version of third source code. Additionally, the method further includes storing a local version of the third source code at a local location that is different from the third location.

In some arrangements, the local version of the third source code is different from (e.g., newer than, older than, doesn't match, etc.) the particular version of third source code. Additionally, building particular software components of the new software build includes building a certain software component using the local version of the third source code in place of the particular version of third source code stored by the third SCM system.

Another embodiment is directed to electronic equipment which includes memory, and control circuitry coupled to the memory. The memory stores instructions which, when carried out by the control circuitry, cause the control circuitry to:

(A) receive abstract hash values for source code components, each abstract hash value being derived from a most recent source code version of a respective source code component, (B) generate new build fingerprints based on the abstract hash values, the new build fingerprints being different from the abstract hash values received for the source code components, and (C) build particular software components of a new software build based on comparisons between the new build fingerprints and respective previous build fingerprints generated during a set of previous software builds.

Yet another embodiment is directed to a computer program product having a non-transitory computer readable medium which stores a set of instructions to control a new software build. The set of instructions, when carried out by computerized circuitry, causing the computerized circuitry to perform a method of:

(A) receiving abstract hash values for source code components, each abstract hash value being derived from a most recent source code version of a respective source code component;

(B) generating new build fingerprints based on the abstract hash values, the new build fingerprints being different from the abstract hash values received for the source code components; and (C) building particular software components of the new software build based on comparisons between the new build fingerprints and respective previous build fingerprints generated during a set of previous software builds.

It should be understood that, in the cloud context, at least some of electronic circuitry such as a source code repository or a server that hosts the build engine may be formed by remote computer resources distributed over a network. Such an electronic environment is capable of providing certain advantages such as source code placement closer to certain users (e.g., source code developers), high availability and data protection, transparent operation, enhanced security, scalability, and so on.

Other embodiments are directed to electronic systems and apparatuses, processing circuits, computer program products, and so on. Some embodiments are directed to various methods, electronic components and circuitry which are involved in providing build avoidance without requiring local source code.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to providing build avoidance without requiring local source code. In particular, the improved technique involves creating abstract hash values from source code and then generating build fingerprints from the abstract hash values. An abstract hash value for particular source code only changes when there is an actual change to that source code. Along these lines, if the particular source code is changed (e.g., an instruction is added, deleted and/or modified), the abstract hash value for the changed source code will be different from the abstract hash value for the original source code. However, if the particular source code is simply touched or has a changed timestamp, the abstract hash value for that source code stays the same. Since build fingerprints are generated from abstract hash values rather than source code, there is no need to provide source code locally to a build automation tool. Instead, for a new software build, the abstract hash values are input to a build engine server (or system) which generates new build fingerprints. The build engine server then compares the new build fingerprints to previous build fingerprints and, if there are build fingerprint matches, the build engine server is able to avoid building the corresponding software components (i.e., the source code for the corresponding software components is not needed).

Figure 1:
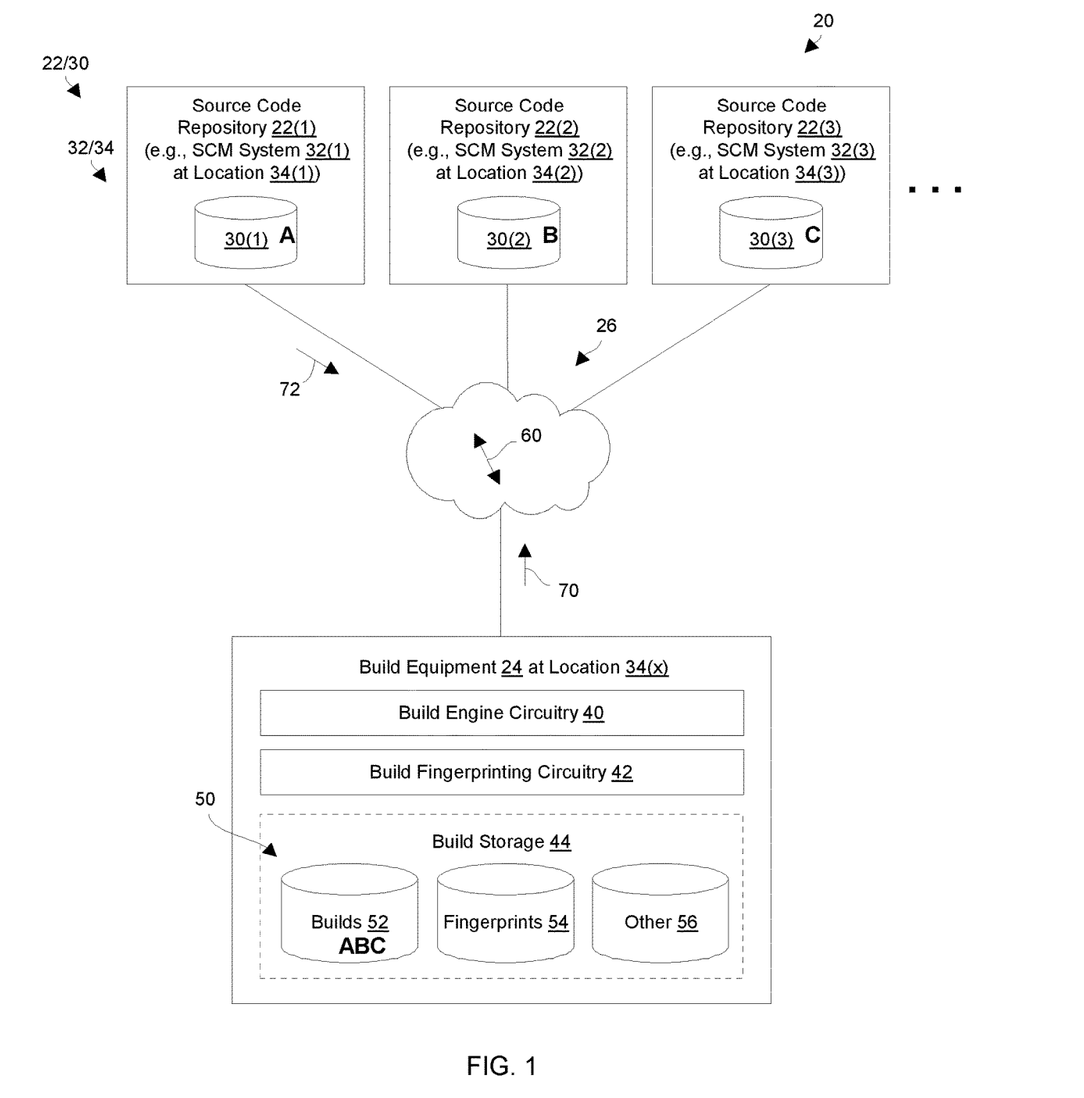
FIG. 1 is a block diagram of a software development environment in accordance with certain embodiments.

FIG. 1 shows a software development environment 20 which provides build avoidance without requiring local source code during a build. The software development environment 20 includes source code repositories 22(1), 22(2), 22(3), . . . (collectively, source code repositories 22), build equipment 24, and a communications medium 26.

Each source code repository 22 is constructed and arranged to provide a platform for storing and managing respective source code 30 (e.g., to write/edit source code, check-in/check-out source code, merge source code, perform version control, etc.). Along these lines, the source code repository 22(1) stores and manages source code 30(1) (e.g., for software component A). Additionally, the source code repository 22(2) stores and manages source code 30(2) (e.g., for software component B), the source code repository 22(3) stores and manages source code 30(3) (e.g., for software component C), and so on.

In accordance with certain embodiments, the source code repositories 22 include respective source code management (SCM) systems 32 and reside at different locations 34. Along these lines, the source code repository 22(1) includes SCM system 32(1) and resides at respective location 34(1), the source code repository 22(2) includes SCM system 32(2) and resides at respective location 34(2), the source code repository 22(3) includes SCM system 32(3) and resides at respective location 34(3), and so on. The SCM systems 32 may be separate and operate independently of each other. Additionally, the locations 34 of the source code repositories 22 may be different from each other (e.g., in different servers/equipment, in different buildings, in different cities, etc.).

The build equipment 24 is constructed and arranged to build software from the source code 30 stored at the source code repositories 22. To this end, the build equipment 24 includes build engine circuitry 40 for performing software builds, build fingerprinting circuitry 42 for generating build fingerprints to determine whether building certain software components can be avoided, and build storage 44 for storing a variety of software constructs 50. Such software constructs 50 may include results (or artifacts) of builds 52 (e.g., a build database 52), build fingerprints 54 (e.g., a build fingerprint database 54), as well as other software constructs 56.

In accordance with certain embodiments, the build equipment 24 is separate and operates independently of the source code repositories 22 (e.g., on different servers, in different buildings, in different cities, etc.). Along these lines, the build equipment 24 may reside at a location 32(x) which is different from the locations 34 of the source code repositories 22. Nevertheless, nothing precludes the build equipment 24 from performing builds using local source code.

The communications medium 26 is constructed and arranged to connect the various components of the software development environment 20 together to enable these parts of the environment 20 to exchange electronic signals 60 (e.g., see the double arrow 60). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, cellular communications, combinations thereof, etc.

During operation, the users (e.g., software developers) store and manage source code 30 via the source code repositories 22. Along these lines, some of the repository equipment may offer advanced features such as authentication, sophisticated graphical user interfaces for enhanced control, language sensitive editors, version control, backups/archiving, redundancy/fault tolerance, and so on.

When a project is ready to perform a new build (e.g., to create artifact ABC from software component artifacts A, B, and C), the build equipment 34 sends query messages 70 to the source code repositories 22. In response, the source code repositories 22 return hash value messages 72 containing abstract hash values based on hashes of the source code 30. The build equipment 34 then evaluates the returned abstract hash values 72 to determine which source code 30 has changed and should be built. In particular, if there are matches between the returned abstract hash values 72 and previous abstract hash values 72 obtained from one or more earlier-performed builds, the build equipment 34 may use the results of the earlier builds (e.g., prebuilt artifacts). Accordingly, the build equipment 34 is able to achieve build avoidance without requiring local source code. As a result, there are less computerized resources consumed such as network bandwidth, storage space, processor cycles, and so on. Further details will now be provided with reference to FIG. 2.

Figure 2:
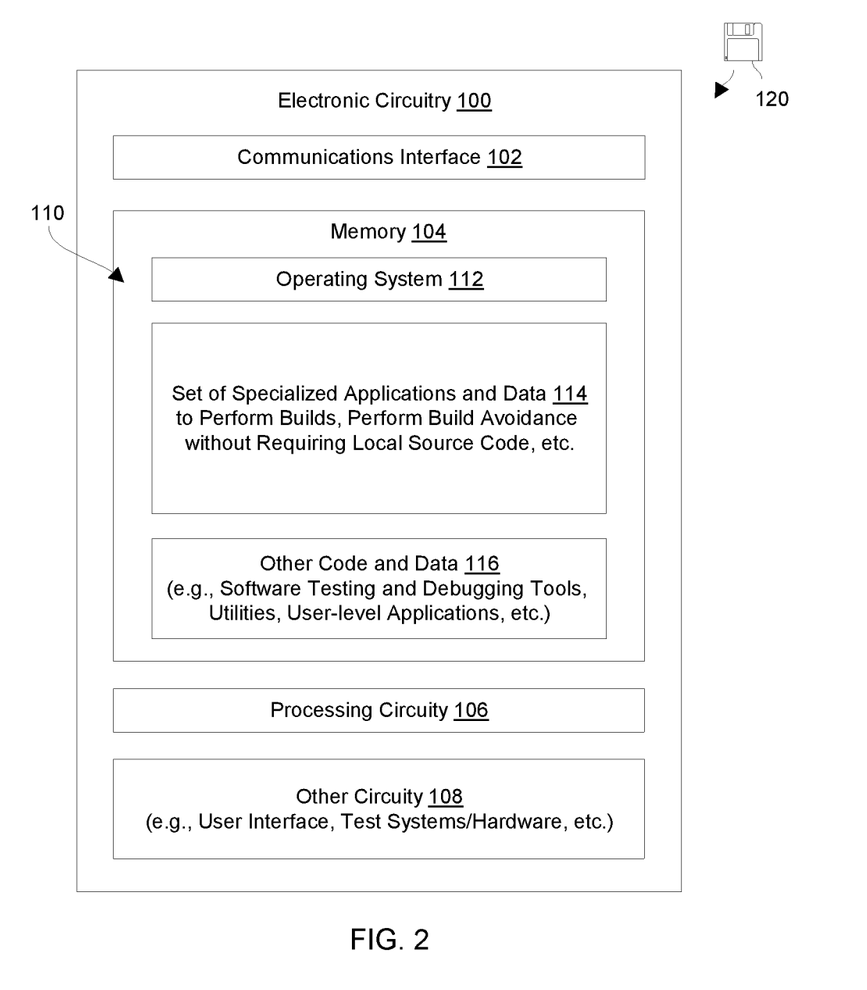
FIG. 2 is a block diagram of electronic circuitry which is suitable for use within the software development environment in accordance with certain embodiments.

FIG. 2 shows electronic circuitry 100 which is suitable for use as at least a portion of the build equipment 24 (also see FIG. 1) in accordance with certain embodiments. The electronic circuitry 100 includes a communications interface 102, memory 104, processing circuitry 106, and other circuitry 108.

The communications interface 102 is constructed and arranged to connect the electronic circuitry 100 to the communications medium 26 (also see FIG. 1) to enable communications with other devices of the software development environment 20 (e.g., the source code repositories 22, etc.). Such communications may be IP-based, SAN-based, cellular-based, cable-based, fiber-optic based, wireless, cloud-based, combinations thereof, and so on. Accordingly, the communications interface 102 enables the electronic circuitry 100 to robustly and reliably communicate with other external apparatus.

The memory 104 is intended to represent both volatile storage (e.g., DRAM, SRAM, etc.) and non-volatile storage (e.g., flash memory, magnetic memory, etc.). The memory 104 stores a variety of software constructs 110 including an operating system 112, a set of specialized applications and data 114, and other applications and data 116. The operating system 112 is intended to refer to specialized code such as a kernel to manage resources of the electronic circuitry 100 (e.g., processor cycles, memory space, etc.), drivers, and so on. The set of specialized applications and data 114 includes specialized code that enables the electronic circuitry 100 to perform builds, perform build avoidance without requiring local source code, and so on. The other applications and data 116 represent other constructs for other operations such as software testing and debugging tools, user-level applications, other administrative tools, utilities, and so on.

The processing circuitry 106 is constructed and arranged to operate in accordance with the various software constructs 110 stored in the memory 104. In particular, the processing circuitry 106 operates in accordance with the set of specialized applications and data 114 to form specialized circuitry which, among other things, performs build avoidance without requiring local source code. Such specialized circuitry may be further implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 120 is capable of delivering all or portions of the software constructs 110 to the electronic circuitry 100. In particular, the computer program product 120 has a non-transitory (or non-volatile) computer readable medium which stores a set of instructions which controls one or more operations of the electronic circuitry 100. Examples of suitable computer readable storage media include tangible articles of manufacture and apparatus which store instructions in a non-volatile manner such as CD-ROM, DVD, flash memory, disk memory, tape memory, and the like.

The other circuitry 108 of the electronic circuitry 100 represents additional circuits, components, and other hardware such as a user interface (or terminal) that enables a user to enter commands and/or configure the electronic circuitry 100 for builds, testing platforms and other hardware for evaluating and maintaining artifacts, and so on. Further details will now be provided with reference to FIGS. 3 through 5.

Figure 3:
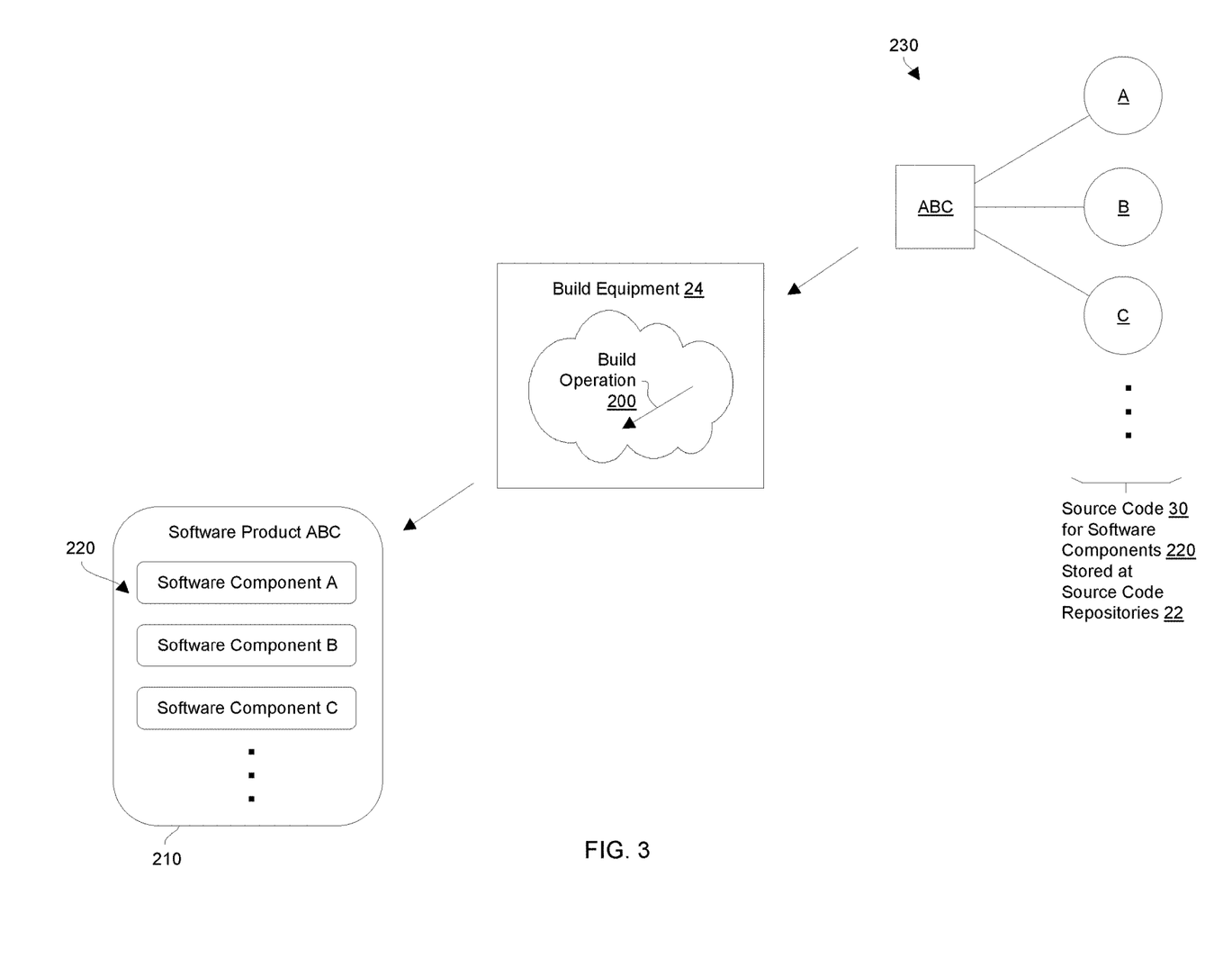
FIG. 3 shows general details regarding how build equipment of the software development environment performs a build operation.
Figure 4:
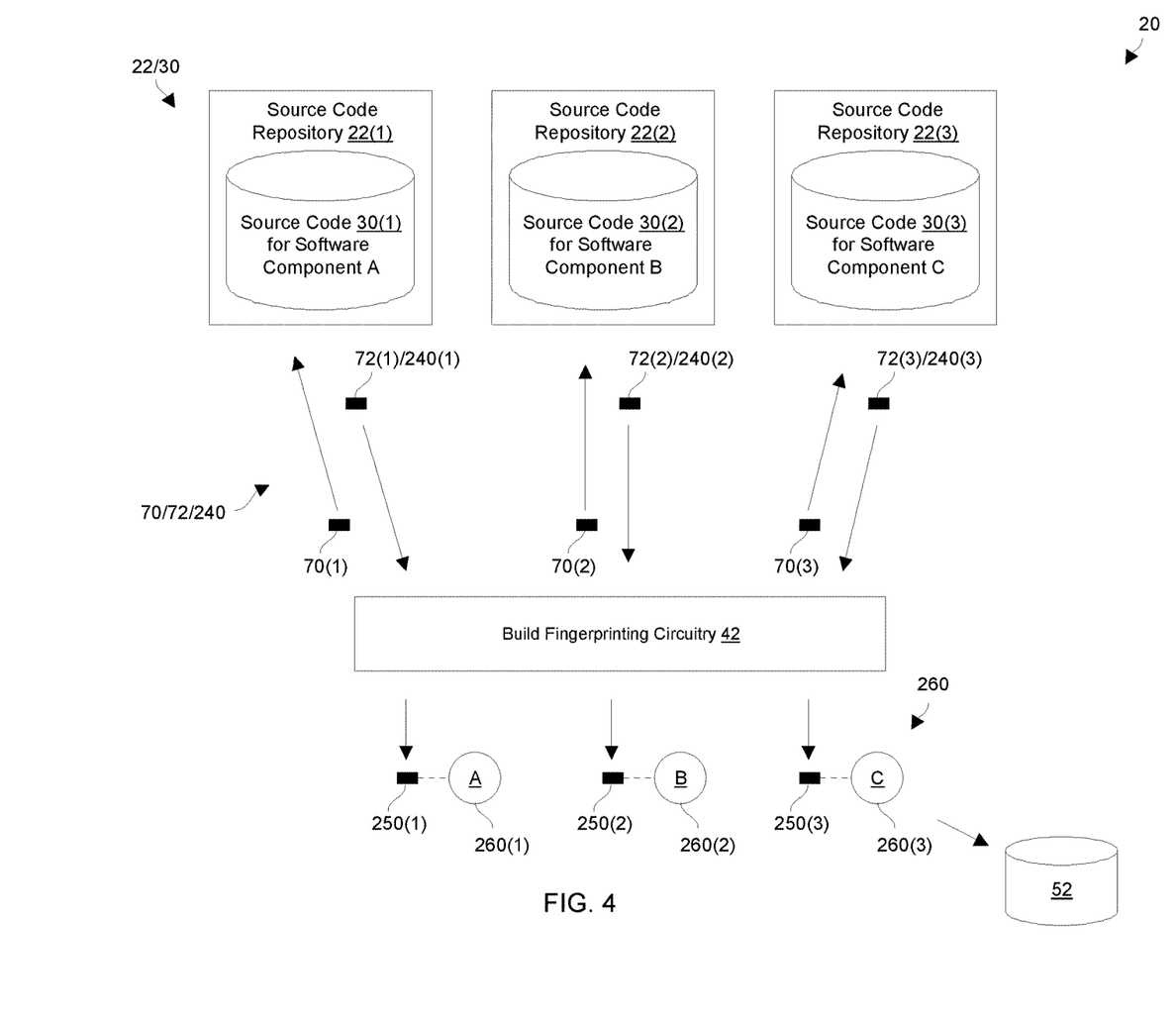
FIG. 4 shows how the build equipment performs a build operation for an initial software build.
Figure 5:
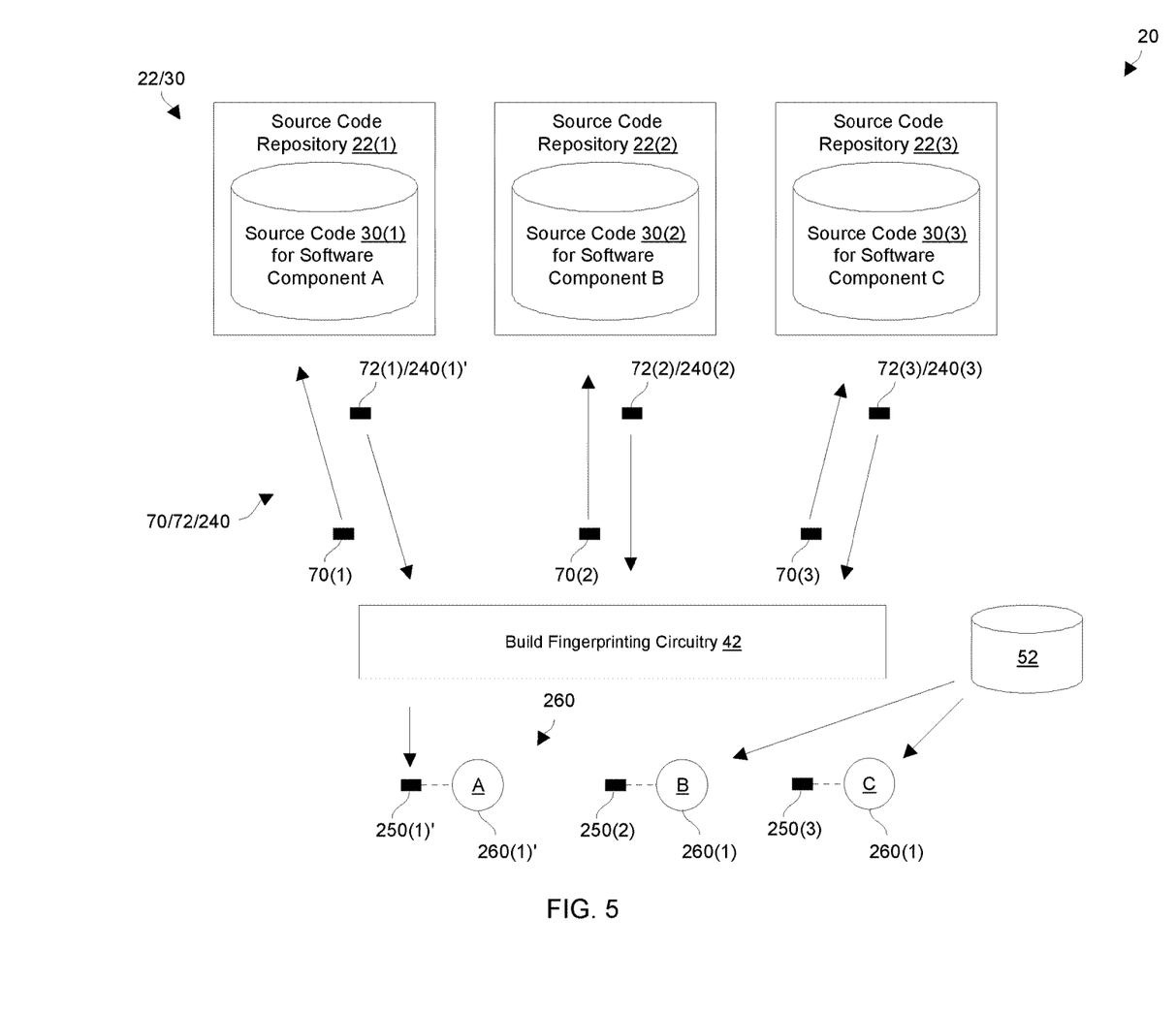
FIG. 5 shows how the build equipment performs a build operation for a subsequent software build which enjoys build avoidance.

Further details will now be provided via an example and reference to FIGS. 3 through 5. FIG. 3 shows general details regarding how the build equipment 24 (also see FIG. 1) performs a build operation 200 to create a software build 210 having software components 220. FIG. 4 shows how the build equipment 24 performs the build operation 200 for a first software build 210. FIG. 5 shows how the build equipment 24 performs the build operation 200 for another software build 210 which enjoys build avoidance.

As shown in FIG. 3, the build equipment 24 performs a build operation (or software build) 200 to create a software product 210 having multiple software components 220 (also see the build database 52 in FIG. 1). Such a build operation 200 may involve compiling source code into binary code, packaging the binary code, bundling the binary code with a set of libraries, running automated tests on the binary code, and so on, in accordance with a build plan 230 (e.g., a set of build directives, scripts, makefiles, manually entered commands and selections, etc.). Additionally, suitable software components 210 include executables, libraries, modules, blobs, objects, other types of artifacts/components, combinations thereof, etc.

By way of example, the build plan 230 for the software product 210 has a simple configuration in the shape of a tree where the example built result, i.e., software product ABC, includes software components A, B, and C (and perhaps others). It should be understood that other configurations are suitable as well, e.g., where one or more software components 220 include other software components (or sub-components) 220, where the software product 210 is itself a software component (or sub-component) 220 of yet another software product 210, where the configuration has a shape other than a tree, and so on.

FIG. 4 shows particular details of the software development environment 20 which are involved in during a front-end portion of the build process 200. In particular, the source code repositories 22 are shown communicating with the build fingerprinting circuitry 42 of the build equipment 24. The source code repositories 22 and the build equipment 24 may reside at different locations and communicate over a computerized network (also see the communications medium 26 in FIG. 1). As shown in FIG. 4, the source code 30 for the software components A, B, C resides in the source code repositories 22(1), 22(2), 22(3), respectively. Locating the source code 30 within the respective source code repositories 22 enables developers to easily access, edit, and maintain the source code 30 during development.

At some point, suppose that the decision is made to perform a build operation 200 to build an initial version of the software product 210 (FIG. 3). In this situation, the build fingerprinting circuitry 42 of the build equipment 24 (FIG. 1) communicates with the source code repositories 22 to determine which software components 210 must be built during the build operation 200.

In particular, the build fingerprinting circuitry 42 of the build equipment 24 sends a query message 70(1) to the source code repository 22(1) to obtain an abstract hash value 220(1) for the source code 30(1) for software component A. In response, the source code repository 22(1) applies a hash algorithm to the source code 30(1) to derive an abstract hash value 240(1), and returns a message 72(1) containing the abstract hash value 240(1) to the build fingerprinting circuitry 42. The abstract hash value 240(1) may be a hexadecimal number that is unique to the current source code 30(1) for software component A (i.e., wherein any change to the source code 30(1) results in a different hexadecimal number). That is, the abstract hash value 240(1) is derived from a most recent source code version of the source code 30(1). Since the abstract hash value 240(1) is computed from the source code 30(1) for software component A, the abstract hash value 240(1) is considered to correspond to software component A.

The build fingerprinting circuitry 42 then generates a build fingerprint 250(1) using the abstract hash value 240(1) as input. The build fingerprinting circuitry 42 stores the build fingerprint 250(1) for future reference (also see the fingerprints 54 in FIG. 1). Since the build fingerprint 250(1) is computed from the abstract hash value 240(1) for software component A, the build fingerprint 250(1) also is considered to correspond to software component A.

In accordance with certain embodiments, the process for generating a build fingerprint 250 from an abstract hash value 240 may be similar to the process for generating that abstract hash value 240 from source code 30. That is, the build fingerprinting circuitry 42 applies a hashing algorithm to the abstract hash value 240 to obtain a hashing result as the build fingerprint 250. Accordingly, the build fingerprint 250 may also be a hexadecimal number, and each abstract hash value 240 hashes into a different build fingerprint 250.

It should be understood that since the build fingerprinting circuitry 42 currently does not have any build fingerprints 250 for software component A, the build fingerprinting circuitry 42 determines that there is no prebuilt artifact available for use as the software component A and concludes that the software component A must be built from the source code 30(1).

Similarly, the build fingerprinting circuitry 42 sends a query message 70(2) to the source code repository 22(2) to obtain an abstract hash value 220(2) for the source code 30(2) for software component B. In response, the source code repository 22(2) applies a hash algorithm to the source code 30(2) to derive an abstract hash value 240(2), and returns a message 72(2) containing the abstract hash value 240(2) to the build fingerprinting circuitry 42. Again, since the abstract hash value 240(2) is computed from the source code 30(2) for software component B, the abstract hash value 240(2) is considered to correspond to software component B.

The build fingerprinting circuitry 42 then generates a build fingerprint 250(2) using the abstract hash value 240(2) as input. Since the build fingerprint 250(2) is computed from the abstract hash value 240(2) for software component B, the build fingerprint 250(2) also is considered to correspond to software component B.

Again, since the build fingerprinting circuitry 42 currently does not have any build fingerprints 250 for software component B, the build fingerprinting circuitry 42 determines that there is no prebuilt artifact available for use as the software component B and concludes that the software component B must be built from the source code 30(2).

Likewise, the build fingerprinting circuitry 42 sends a query message 70(3) to the source code repository 22(3) to obtain an abstract hash value 220(3) for the source code 30(3) for software component C. In response, the source code repository 22(3) applies a hash algorithm to the source code 30(3) to derive an abstract hash value 240(3), and returns a message 72(3) containing the abstract hash value 240(3) to the build fingerprinting circuitry 42. Since the abstract hash value 240(3) is computed from the source code 30(3) for software component C, the abstract hash value 240(3) is considered to correspond to software component C.

The build fingerprinting circuitry 42 then generates a build fingerprint 250(3) using the abstract hash value 240(3) as input. Since the build fingerprint 250(3) is computed from the abstract hash value 240(3) for software component C, the build fingerprint 250(3) also is considered to correspond to software component C.

Furthermore, since the build fingerprinting circuitry 42 currently does not have any build fingerprints 250 for software component C, the build fingerprinting circuitry 42 determines that there is no prebuilt artifact available for use as the software component C and concludes that the software component C must be built from the source code 30(3).

It should be understood that the example software product ABC was described above as simply including software components A, B, and C by way of example only. However, the software products 210 that are built may include a different number of software components 220 (also see FIG. 3). Along these lines, if there are more software components 220, the process of generating build fingerprints 250 from abstract hash values 240 continues for the remaining software components (or modules) 220 (e.g., D, E, F, . . . ) that are included in the software product 210.

Additionally, it should be understood that the build fingerprinting circuitry 42 was described above as obtaining messages 72 containing abstract hash values 240 from the source code repositories 22 in response to query messages 70. Alternatively, the source code repositories 22 may generate and send messages 72 containing the abstract hash values 240 to the build fingerprinting circuitry 42 upon particular source code storage events such as when the source code 30 is saved in the source code repositories 22, when checked-in, when committed, and/or at build time, etc.

Moreover, it should be understood that each source code repository 22 has been described in this example as managing the source code 30 for just one software component 210. In other embodiments, the software development environment 20 includes at least one source code repository 22 that manages the source code 30 for multiple software components 220, and that source code repository 22 provides a respective abstract hash value 240 for each software component 220.

Once the build fingerprinting circuitry 42 has generated build fingerprints 250 for all of the software components 220 belonging to the build (e.g., in accordance with the build plan 230, also see FIG. 3), the build fingerprinting circuitry 42 stores the build fingerprints in the build fingerprint database 54 (also see FIG. 1).

Next, the build engine circuitry 44 (FIG. 1) builds the software product 210 using the source code 30 for the various software components 220. Only the source code 30 for components 220 that are actually being built are input to the build engine circuitry 44 to build the software product 210. The build engine circuitry 44 stores the software product 210 for future access, also see the build database 52 in FIG. 1.

Additionally, as the software product 210 is stored in the build database 52, the build fingerprinting circuitry 42 accesses the build fingerprint database 54 and maps the build fingerprints 250 for the respective software components 220 to the individual artifacts 260 of the software product 210. In particular, the build fingerprinting circuitry 42 maps the build fingerprint 250(1) for software component A to the built artifact 260(1) for software component A, the build fingerprint 250(2) for software component B to the built artifact 260(2) for software component B, and the build fingerprint 250(3) for software component C to the built artifact 260(3) for software component C (illustrated by the dashed lines in FIG. 4).

Since this is the initial build, there are no matches of current build fingerprints 240 to previous build fingerprints 240 (also see the fingerprints 54 in FIG. 1). This is because there are no earlier-built artifacts (also see the build database 52 in FIG. 1) that would enable build avoidance.

Suppose that some time passes in which the source code 30 managed by the source code repositories 22 is further developed. Along these lines, for one or more of the source code components 220 may be changed (e.g., the contents of source code files are edited with added material, deleted material, modified material, etc.).

By way of example and with reference now to FIG. 5, suppose that the source code 30 for software component A has changed. However, suppose that the source code for software components B and C has not changed. Further suppose that the decision is made to perform a new build operation 200 to build a new version of the software product 210 in accordance with the build plan 230 (FIG. 3). In this situation, the build fingerprinting circuitry 42 of the build equipment 24 (FIG. 1) again communicates with the source code repositories 22 to determine which software components 210 must be built during the new build operation 200.

Here, the build fingerprinting circuitry 42 sends a new query message 70(1) to the source code repository 22(1). In response and since the source code 30(1) for software component A has changed, the source code repository 22(1) applies the hash algorithm to the source code 30(1) to derive a new abstract hash value 240(1)', and returns a message 72(1) containing the new abstract hash value 240(1)' to the build fingerprinting circuitry 42. In particular, the abstract hash value 240(1)' is derived from a most recent source code version of the source code 30(1) and is thus different from the earlier-provided abstract hash value 240(1).

The build fingerprinting circuitry 42 then generates a new build fingerprint 250(1)' using the new abstract hash value 240(1)' as input. The build fingerprinting circuitry 42 stores the new build fingerprint 250(1) for future reference (also see the fingerprints 54 in FIG. 1). Since the new build fingerprint 250(1)' is computed from the new abstract hash value 240(1)' for software component A, the new build fingerprint 250(1)' also is considered to correspond to software component A.

At this point, the build fingerprinting circuitry 42 determines that the new build fingerprint 250(1)' for software component A does not match the previous build fingerprint 250(1) for software component A. Since there is not a match, the build fingerprinting circuitry 42 concludes that the source code 30(1) for the software component A has changed and that software component A requires building.

However, the build fingerprinting circuitry 42 sends a new query message 70(2) to the source code repository 22(2). In response and since the source code 30(2) for software component B has not changed, the source code repository 22(2) applies the hash algorithm to the source code 30(2) to derive the same abstract hash value 240(2) as before (i.e., the previously provided abstract hash value 240(2)), and returns a message 72(2) containing the previously provided abstract hash value 240(2) to the build fingerprinting circuitry 42.

The build fingerprinting circuitry 42 then generates the same build fingerprint 250(2) as before since the abstract hash value 240(2) is the same. Accordingly, the build fingerprinting circuitry 42 determines that the build fingerprint 250(2) for software component B matches the previous build fingerprint 250(2) for software component B. As a result, the build fingerprinting circuitry 42 concludes that the source code 30(2) for the software component B has not changed and that software component C does not require building.

Likewise, the build fingerprinting circuitry 42 sends a new query message 70(3) to the source code repository 22(3). In response and since the source code 30(3) for software component C has not changed, the source code repository 22(3) applies the hash algorithm to the source code 30(3) to derive the same abstract hash value 240(3) as before (i.e., the previously provided abstract hash value 240(3)), and returns a message 72(3) containing the previously provided abstract hash value 240(3) to the build fingerprinting circuitry 42.

The build fingerprinting circuitry 42 then generates the same build fingerprint 250(3) as before using the previously provided abstract hash value 240(3) as input. At this point, the build fingerprinting circuitry 42 determines that the build fingerprint 250(3) for software component C matches the previous build fingerprint 250(3) for software component C. Accordingly, the build fingerprinting circuitry 42 concludes that the source code 30(3) for the software component C has not changed and that software component C does not require building.

Once the build fingerprinting circuitry 42 has generated build fingerprints 250 for all of the software components 220 belonging to the build and determined which software components 220 do not need to be built based on discovering matches between new build fingerprints 250 and previous build fingerprints 250, the build engine circuitry 44 (FIG. 1) builds the software product 210 using only the changed source code 30, i.e., the source code 30(1) for software component A. That is, since there was a match in build fingerprints 250 for software components B and C, the build circuitry 24 concluded that software components B and C do not need to be built. Rather, the build equipment 24 may use the previously built software components B and C, i.e., prebuilt artifacts from the stored build database 52, thus providing build avoidance. Accordingly, the source code 30(2) and 30(3) for software components B and C does not need to be transferred from the source code repositories 22(2) and 22(3) to the build equipment 24 and processing time/cycles do not need to be consumed to build the software components B and C again.

Once the build engine circuitry 44 builds a new software product 210, the build engine circuitry 44 stores the software product 210 for future access in the build database 52. In particular, the build engine circuitry 44 builds a new artifact 260(1)' for software component A. For software components B and C, prebuilt artifacts 260(2) and 260(3) are available in the build database 52. Additionally, during storage of new artifact 260(1)', the build fingerprinting circuitry 42 maps the new build fingerprint 250(1)' to the latest build 260(1)' of software component A. Further details will now be provided with reference to FIG. 6.

Figure 6:
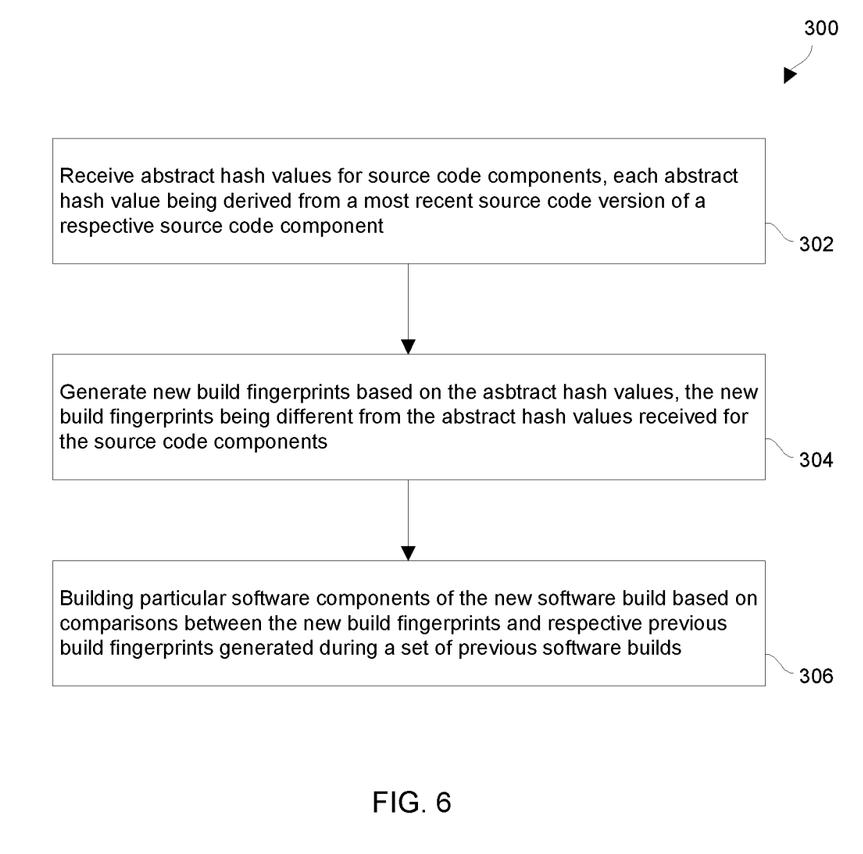
FIG. 6 is a flowchart of a procedure which is performed by the software development environment in accordance with certain embodiments.

FIG. 6 is a flowchart of a procedure 300 which is performed by the build equipment 24 of the software development environment 20 to control a new software build (also see FIG. 1). In particular, the procedure 300 enjoys build avoidance without requiring local source code.

At 302, the build equipment 24 receives abstract hash values for source code components. Each abstract hash value is derived from a most recent source code version of a respective source code component.

At 304, the build equipment 24 generates new build fingerprints based on the abstract hash values. The new build fingerprints are different from the abstract hash values received for the source code components.

At 306, the build equipment 24 builds particular software components of the new software build based on comparisons between the new build fingerprints and respective previous build fingerprints generated during a set of previous software builds.

As described above, improved techniques are directed to providing build avoidance without requiring local source code. In particular, the improved techniques involve creating abstract hash values 240 from source code 30 and then generating build fingerprints 250 from the abstract hash values 240. An abstract hash value 240 for particular source code 30 only changes when there is an actual change to that source code 30. Along these lines, if the particular source code 30 is changed (e.g., an instruction is added, deleted and/or modified), the abstract hash value 240 for the changed source code 30 will be different from the abstract hash value 240 for the original source code 30. However, if the particular source code 30 is simply touched or has a changed timestamp, the abstract hash value 240 for that source code 30 stays the same. Since build fingerprints 250 are generated from abstract hash values 240 rather than source code 30, there is no need to provide source code locally to a build automation tool. Instead, for a new software build 200, the abstract hash values are input to build equipment 24 which generates new build fingerprints 250. The build equipment 24 then compares the new build fingerprints 250 to previous build fingerprints 250 and, if there are build fingerprint matches, the build equipment 24 is able to avoid building the corresponding software components 260 (i.e., the source code 30 for the corresponding software components 260 is not needed).

One should appreciate that the above-described techniques do not merely receive, collect and analyze data. Rather, the disclosed techniques involve improvements to the technology such as improving build performance by build equipment 24 by eliminating the need locally for certain source code 30 (e.g., less consumed network bandwidth, less consumed storage space and processing cycles at the build equipment location, etc.).

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the source code repositories 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It should be understood that the computation of a "fingerprint" for build system components (or modules) is now available leading build system engines. These engines are able to determine whether build output can be reused, or whether a rebuild is required, by comparing these fingerprints. However, conventional systems are based on computing values based on the data in locally present source code. However, in accordance with certain embodiments disclosed herein, the direct reading of source code is replaced with an abstract hash provided by a source code management system, and augment that with reading data only from files that differ in comparison to the inputs used to construct the abstract hash provided by the source code management system. By doing so, build operation can commence whether source code is locally present or not, and seamlessly transition between the two states for any source control module, because the fingerprint calculation in unaffected.

In accordance with certain embodiments, build equipment determines whether it is necessary to rebuild components, or whether previously built artifacts can be used. However, the build equipment is able to make such a determination without needing to perform a local checkout of the source code. In some arrangements, the source code modules are each separate source code management (SCM) repositories, and it is desired to not require each one to be cloned and locally available, where possible. Therefore, the source code is not provided to the build equipment, as it normally would be in conventional systems. Rather, the build equipment is provided with an abstract value representing the source code, provided by the source code management (SCM) system. With the SCM system, each version of the source code is represented by a commit object, which has a unique hash value computed by the SCM system. Each commit points to a tree object, which, recursively, points at other tree and blob objects, which define the source code that is being managed. Each object has a unique hash value. In contrast to conventional approaches, source code is replaced by the hash value for the top level tree object, the one pointed at by the commit object. In doing so, there is no need for the build equipment to directly access the source code in order to determine if the previously built artifacts suffice.

When source code modules have not been locally cloned, the build equipment can query the SCM server and retrieve this abstract information. In this way, the fingerprint can be computed whether or not the source code is present. Moreover, the computed fingerprint is the exactly same value whether or not the source code is present (as long as it is unmodified). This enables certain features such as pulling pre-built artifacts without having the source code present, or pulling down the source code only on demand, as needed.

It should be understood that source code may be modified beyond what is currently represented by the tree object tracked by the associated commit object. Therefore, when source code is locally present, we have the SCM system report back these files, and the build equipment factors in the content of those files—and those files only—into the computed fingerprint. In doing so, the system works seamlessly when there is modification to local files.

There are currently no other systems that function seamlessly in this way, behaving exactly the same way without regard to the locality of the source code. Some conventional systems support a build caching mechanism. This mechanism has built in support to calculate a build cache key based on specified inputs, such as custom data, dependencies, and source code. However, once again, the build cache system requires that the source code be locally available. While it may have some features to deal with the presence or absence of local code ("included builds"), this does not extend to the build cache system.

It should be understood that, in accordance with certain embodiments, the build not only includes source code from remote locations but also includes locally present source code. Such local source code may be different from the source code at the remote locations (e.g., newer than, older than, doesn't match, etc.).

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

For example, some of the improvements disclosed herein may be applied or extended to other systems that provide base requirements.

Moreover, nothing precludes the use of additional input when creating build fingerprints. Along these lines, other parameters may be included with the abstract hash values such as dependency lists, build attributes (e.g., whether debugger functionality is included, etc.), variants, and so on. Such modifications and enhancements are intended to belong to various embodiments of the disclosure.

What is claimed is:

1. A method of controlling a new software build, the method comprising:
  receiving abstract hash values for source code components, wherein each abstract hash value is derived from a most recent source code version of a respective source code component;
  generating new build fingerprints based on the abstract hash values, wherein the new build fingerprints are different from the abstract hash values received for the source code components; and
  building particular software components of the new software build based on comparisons between the new build fingerprints and respective previous build fingerprints generated during a set of previous software builds;
  wherein building the particular software components of the new software build includes:
    building a first software component in response to a first comparison result indicating that a first new build fingerprint does not match a first previous build fingerprint, and
    refraining from building a second software component in response to a second comparison result indicating that a second new build fingerprint matches a second previous build fingerprint.

2. A method as in claim 1 wherein the source code components include a first source code component residing at a first location and a second source code component residing at a second location that is different from the first location; and
  wherein receiving the abstract hash values for the source code components includes:
    obtaining, over a computer network, a first abstract hash value from the first source code component residing at the first location and a second abstract hash value from the second source code component residing at the second location.

3. A method as in claim 2 wherein the first source code component residing at the first location includes a first source code management (SCM) system that stores first source code;
  wherein the second source code component residing at the second location includes a second SCM system that stores second source code that is different from the first source code; and
  wherein obtaining the first abstract hash value and the second abstract hash value includes:
    querying the first SCM system to derive the first abstract hash value based on a most recent version of the first source code, and
    separately querying the second SCM system to derive the second abstract hash value based on a most recent version of the second source code.

4. A method as in claim 3 wherein querying the first SCM system to derive the first abstract hash value includes:
  sending a first query message to the first SCM system over the computer network; and
  wherein querying the second SCM system to derive the second abstract hash value includes:
    sending a second query message to the second SCM system over the computer network prior to receiving the first abstract hash value from the first SCM system in response to the first query message.

5. A method as in claim 2 wherein a build engine system stores the respective previous build fingerprints generated during the set of previous software builds, and wherein the build engine system resides at a build engine location that is different from the first location and that is different from the second location; and
  wherein generating the new build fingerprints based on the abstract hash values includes:
    hashing, by the build engine system, the abstract hash values to generate the new build fingerprints.

6. A method as in claim 5 wherein the first new build fingerprint corresponds to the first source code component and the second new build fingerprint corresponds to the second source code component;
  wherein the build engine system generated the respective previous build fingerprints using a particular hash algorithm; and
  wherein hashing the abstract hash values includes:
    applying the particular hash algorithm to the first abstract hash value from the first source code component to generate the first new build fingerprint corresponding to the first source code component, and
    applying the particular hash algorithm to the second abstract hash value from the second source code component to generate the second new build fingerprint corresponding to the second source code component.

7. A method as in claim 2 wherein the first new build fingerprint corresponds to the first source code component and the second new build fingerprint corresponds to the second source code component; and
  wherein building the particular software components of the new software build further includes:

comparing the first new build fingerprint with the first previous build fingerprint, which corresponds to the first source code component, to provide the first comparison result, and comparing the second new build fingerprint with the second previous build fingerprint, which corresponds to the second source code component, to provide the second comparison result.

8. A method as in claim 7 wherein building the first software component in response to the first comparison result indicating that the first new build fingerprint does not match the first previous build fingerprint includes:

copying first source code from the first source code component residing at the first location to a build engine system at a build engine location over the computer network, the build engine location being different from the first location, and creating the first software component from a version of the first source code copied to the build engine system; and wherein refraining from building the second software component in response to the second comparison result indicating that the second new build fingerprint matches the second previous build fingerprint includes:

refraining from copying second source code from the second source code component residing at the second location to the build engine system at the build engine location over the computer network, and retrieving a prebuilt artifact as the second software component.

9. A method as in claim 2 wherein each fingerprint is an algorithmically computed identifier that is generated by a build engine system; and wherein each abstract hash value is an algorithmically computed identifier that is generated by a source code management (SCM) system that is different from the build engine system.

10. A method as in claim 2 wherein a third source code component residing at a third location includes a third source code management (SCM) system that stores a particular version of third source code; and wherein the method further comprises:

storing a local version of the third source code at a local location that is different from the third location.

11. A method as in claim 10 wherein the local version of the third source code is newer than the particular version of third source code; and wherein building particular software components of the new software build includes:

building a certain software component using the local version of the third source code in place of the particular version of third source code stored by the third SCM system.

12. A method as in claim 1 wherein generating the new build fingerprints based on the abstract hash values includes:

applying a first hash algorithm to a particular hash value, wherein the particular hash value is generated via application of a second hash algorithm to source code.

13. A method as in claim 1, further comprising:

managing, by a build engine system, a respective list of dependencies and a respective set of build attributes for each source code component, wherein the build engine system is constructed and arranged to generate, for each source code component, a new build fingerprint based on a most recent abstract hash value for that source code component, a most recent list of dependencies for that source code component, and a most recent set of build attributes for that source code component.

14. A method of controlling a new software build, the method comprising:

receiving abstract hash values for source code components, wherein each abstract hash value is derived from a most recent source code version of a respective source code component;

generating new build fingerprints based on the abstract hash values, wherein the new build fingerprints are different from the abstract hash values received for the source code components;

building particular software components of the new software build based on comparisons between the new build fingerprints and respective previous build fingerprints generated during a set of previous software builds; and managing, by a build engine system, a respective list of dependencies and a respective set of build attributes for each source code component, wherein the build engine system is constructed and arranged to generate, for each source code component, a new build fingerprint based on a most recent abstract hash value for that source code component, a most recent list of dependencies for that source code component, and a most recent set of build attributes for that source code component.

15. Electronic equipment, comprising:

memory; and control circuitry coupled to the memory, the memory storing instructions which, when carried out by the control circuitry, cause the control circuitry to:

receive abstract hash values for source code components, wherein each abstract hash value is derived from a most recent source code version of a respective source code component;

generate new build fingerprints based on the abstract hash values, wherein the new build fingerprints are different from the abstract hash values received for the source code components; and build particular software components of a new software build based on comparisons between the new build fingerprints and respective previous build fingerprints generated during a set of previous software builds;

wherein the control circuitry, when building the particular software components of the new software build, is constructed and arranged to:

build a first software component in response to a first comparison result indicating that a first new build fingerprint does not match a first previous build fingerprint, and refrain from building a second software component in response to a second comparison result indicating that a second new build fingerprint matches a second previous build fingerprint.

16. Electronic equipment as in claim 15 wherein the control circuitry, when generating the new build fingerprints based on the abstract hash values, is further constructed and arranged to:

apply a first hash algorithm to a particular hash value, wherein the particular hash value is generated via application of a second hash algorithm to source code.

17. Electronic equipment as in claim 15 wherein the control circuitry is further constructed and arranged to:

manage a respective list of dependencies and a respective set of build attributes for each source code component; and generate, for each source code component, a new build fingerprint based on a most recent abstract hash value for that source code component, a most recent list of dependencies for that source code component, and a most recent set of build attributes for that source code component.

18. A computer program product having a non-transitory computer readable medium which stores a set of instructions to control a new software build; the set of instructions, when carried out by computerized circuitry, causing the computerized circuitry to perform a method of:

receiving abstract hash values for source code components, wherein each abstract hash value is derived from a most recent source code version of a respective source code component;

generating new build fingerprints based on the abstract hash values, wherein the new build fingerprints are different from the abstract hash values received for the source code components; and building particular software components of the new software build based on comparisons between the new build fingerprints and respective previous build fingerprints generated during a set of previous software builds;

wherein building the particular software components of the new software build includes:

building a first software component in response to a first comparison result indicating that a first new build fingerprint does not match a first previous build fingerprint, and refraining from building a second software component in response to a second comparison result indicating that a second new build fingerprint matches a second previous build fingerprint.

19. A computer program product as in claim 18 wherein generating the new build fingerprints based on the abstract hash values includes:

applying a first hash algorithm to a particular hash value, wherein the particular hash value is generated via application of a second hash algorithm to source code.

20. A computer program product as in claim 18 wherein the method further includes:

managing, by a build engine system, a respective list of dependencies and a respective set of build attributes for each source code component, wherein the build engine system is constructed and arranged to generate, for each source code component, a new build fingerprint based on a most recent abstract hash value for that source code component, a most recent list of dependencies for that source code component, and a most recent set of build attributes for that source code component.

* * * * *